No. 656,449. Patented Aug. 21, 1900.
A. FERGUSON.
HAY RACK.
(Application filed May 17, 1900.)
(No Model.)
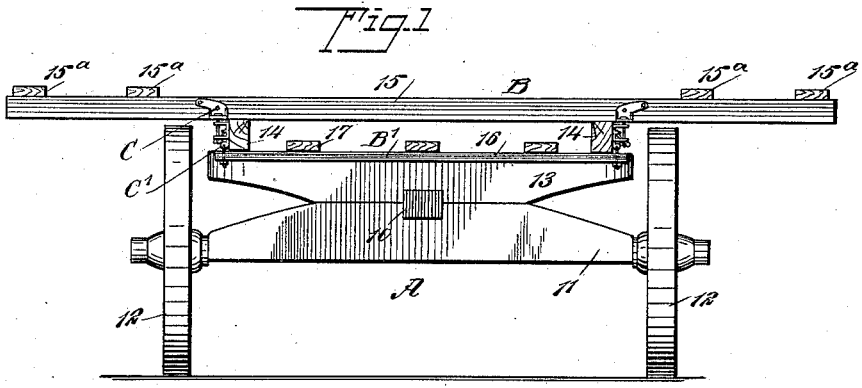
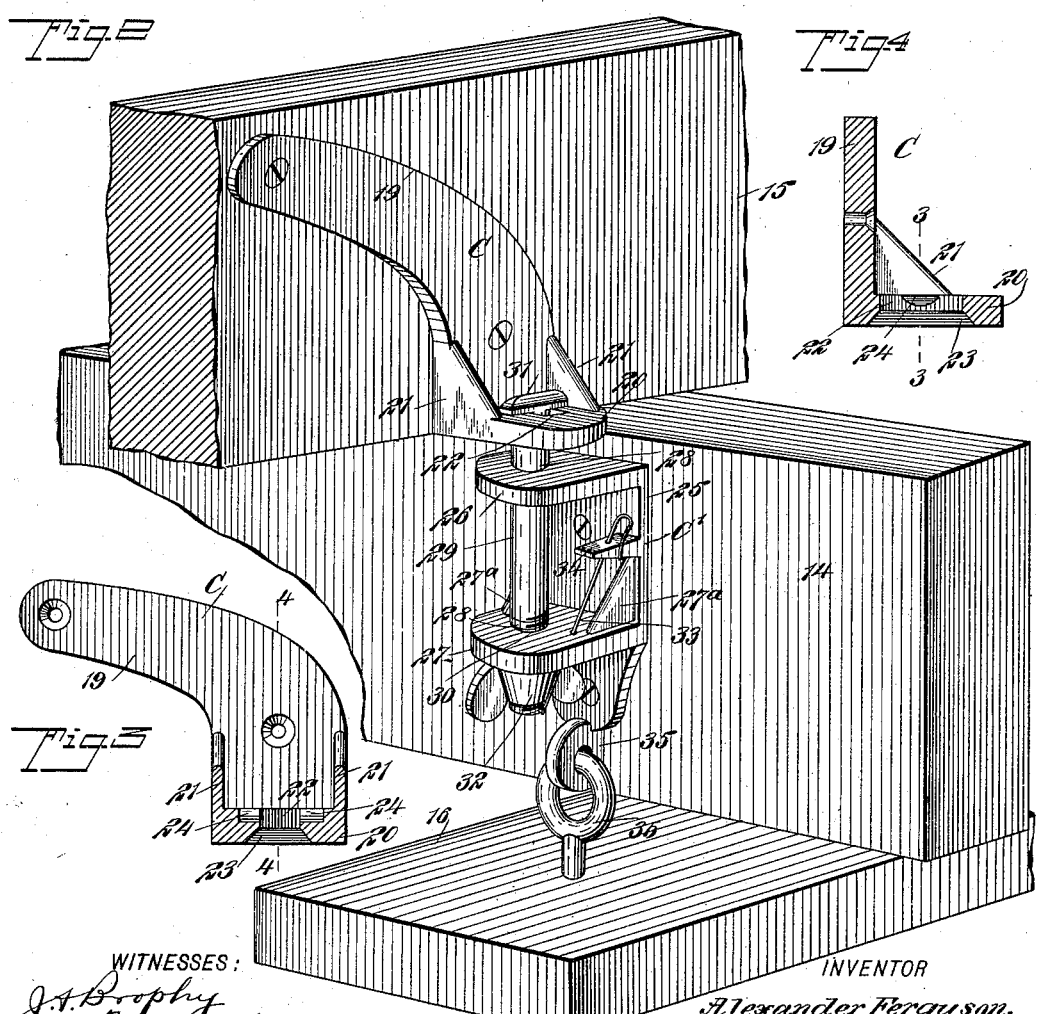
WITNESSES:
INVENTOR
Alexander Ferguson.
BY
ATTORNEYS

UNITED STATES PATENT OFFICE.

ALEXANDER FERGUSON, OF ODELL, ILLINOIS.

HAY-RACK.

SPECIFICATION forming part of Letters Patent No. 656,449, dated August 21, 1900.

Application filed May 17, 1900. Serial No. 17,035. (No model.)

*To all whom it may concern:*

Be it known that I, ALEXANDER FERGUSON, a citizen of the United States, and a resident of Odell, in the county of Livingston and State of Illinois, have invented a new and Improved Hay-Rack, of which the following is a full, clear, and exact description.

The purpose of the invention is to lessen the difficulty usually experienced in placing a hay-rack upon a wagon and removing the same therefrom, which is accomplished by making the rack in sections and providing fastening devices so constructed that the sections may be firmly locked together and readily and quickly separated, thus enabling the rack to be adjusted in sections upon the body or running-gear of a wagon in a convenient and expeditious manner.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a rear elevation of a vehicle having the improvement applied thereto. Fig. 2 is an enlarged perspective view of an end portion of the rack, illustrating the parts locked together and one of the devices employed for accomplishing such result. Fig. 3 is a vertical transverse section through a bracket adapted for attachment to the upper portion of the rack, the section being taken on the line 3 3 of Fig. 4; and Fig. 4 is a vertical longitudinal section through the bracket shown in Fig. 3, taken practically on the line 4 4 of Fig. 3.

A represents a portion of the running-gear of a wagon, including the reach 10, rear axle 11, rear wheels 12, and rear bolster 13. The body or upper portion of the hay-rack B may consist, as shown, of sills 14, which are adapted to rest upon the forward and rear bolsters of the running-gear, and extend forward and rearward beyond such bolsters, and cross-bars 15, which are secured to the sills 14, extending beyond the side portions of the vehicle, together with longitudinal bars 15ª, which are secured upon the cross-bars 15 in any suitable or approved manner. The lower portion B' of the hay-rack is shown as comprising cross-bars 16, adapted for engagement with the bottom of the sills 14 and longitudinal flooring bars, beams, or boards 17, which rest upon the upper surface of the cross-bar 16, and likewise have bearing upon the upper faces of the bolsters of the vehicle, as is illustrated in Fig. 1.

Couplings are employed for detachably connecting the body portion of the hay-rack to the sills, and these couplings consist principally of upper brackets C and lower brackets C'. The body portions 19 of the upper brackets are attached to the main cross-bars 15 of the upper section of the rack, and the bottom of the body extends to the lower edge of such bars or rails, as shown in Fig. 2. An outwardly-extending horizontal member 20 is preferably made integral with the lower portion of the body of each bracket C, being strengthened at its sides by cheek-pieces 21. The horizontal member 20 of each bracket C is provided with a longitudinal slot 22, the bottom portion 23 of which slot is enlarged and the walls thereof are tapered upward, as shown in Fig. 3, and transverse depressions 24 are made in the upper surface of each member 20 of each bracket C, the depressions connecting with the slot 22 of the said member, as is also shown in Fig. 3. These depressions may be angular or they may be semicircular, as illustrated in Fig. 4.

In connection with each upper bracket C a lower bracket C' is employed, and these lower brackets are attached to the inner faces of the sills 14, which rest upon the bolsters. Each of these lower brackets C' consists of an upright body 25, secured in any suitable or approved manner to a sill, and upper and lower horizontal members 26 and 27, the lower members being provided with cheek-pieces 27ª, the said horizontal members being provided with alining openings 28, adapted to receive the body portion of the bolt 29, having an exterior thread 30 at its lower portion, and a head 31, adapted to enter the recesses 24 in the upper bracket, and the upper portion of the head 31 is made tapering at its sides and at its ends, so that the head may be readily passed up through the opening 22 in an upper bracket, which is done after the bolt has been placed in a lower bracket C', and after the head of the bolt has passed through the slot 22 in an upper bracket said bolt 29 is turned, so that the head extends transversely of the slot 22 and rests in the depressions or recesses 24, as shown in Fig. 2. The bolt is thereupon tightened by manipulating a thumb-nut 32 or its equivalent, which is located upon the lower end of the bolt 29 and is screwed to an engagement with the under surface of the lower horizontal member 27 of the lower bracket C', carrying the bolt. The nut 32 is prevented from turning by passing a rod 33, which, in fact, may be a wire, through an opening in the lower horizontal member 27 of the lower bracket C' to an engagement with one wing of the nut 32, and the upper end of the stop rod or wire 33 is passed through a projection 34 from the body portiom 25 of the lower bracket, as shown in Fig. 2, and preferably the upper end of the stop rod or wire 33 is bent upon itself, or it may be provided with a suitable head, which will serve to prevent it from slipping when placed in position. When the upper end of the stop rod or wire is bent upon itself, the upper terminal portion of said rod or wire bears against one side of its upper support 34.

Each lower bracket C' is usually provided with an eye 35 at its lower end, which eyes receive bolts 36 or their equivalents, and these bolts are made to enter and are secured in the cross-bars 16 of the bottom section of the rack, thus suspending the bottom of the rack from the sills 16, as shown in Figs. 1 and 2.

Having thus described my invention, I claim as new and desire to secure by Letters Patent—

1. A coupling for the sections of a hay-rack or a like device, comprising an upper and a lower bracket, the upper bracket being provided with a horizontal extension having a slot therein and recesses in its upper face at the side portions of the slot, and a lower bracket having horizontal extensions, a bolt passed through the extensions of the lower bracket and provided with a head adapted to pass through the slot in the upper bracket and enter the recesses therein, and a locking device for the bolt, as specified.

2. A coupling for the sections of a hay rack or a like device, comprising an upper and a lower bracket, the upper bracket being provided with a horizontal extension having a slot therein and recesses in its upper face at the side portions of the slot, and a lower bracket having horizontal extensions, a bolt passed through the extensions of the lower bracket and provided with a head adapted to pass through the slot in the upper bracket and enter the recesses, and a locking device for the bolt, the lower bracket being also provided with a fastening device adapted to enter a portion of a rack and support the same, and the slot in the upper bracket having its lower portion enlarged and tapered, as described.

3. In a hay-rack, the combination, with a body including sills and a floor-section, of brackets secured to the main portions of the body, each bracket having a horizontal extension, which horizontal extension is provided with a longitudinal slot having an enlarged and tapering bottom portion, the said extension being also provided with recesses in its upper face at the side portions of the slot therein, brackets adapted for attachment to the sills, which sill-brackets are provided with a plurality of horizontal extensions, a bolt held to slide in the side extensions of the sill-brackets, the bolt being provided with a threaded lower end, and a head having a tapering upper surface, a nut located upon the threaded portion of the bolt, a check or stop device for the nut, and a supporting connection between the sill-brackets and the bottom or floor portion of the rack, as set forth.

In testimony whereof I have signed my name to this specification in the presence of two subscribing witnesses.

ALEXANDER FERGUSON.

Witnesses:
ALEXANDER MCDONALD,
JOHN HARTLEY.